United States Patent [19]
Talmy et al.

[11] Patent Number: 5,894,066
[45] Date of Patent: Apr. 13, 1999

[54] BORON CARBRIDE/SILICON CARBIDE CERAMICS

[75] Inventors: Inna G. Talmy, Gaithersburg; James A. Zaykoski, Beltsville, both of Md.

[73] Assignee: The United States of America as represented by the Secretary of the Navy, Washington, D.C.

[21] Appl. No.: 09/005,823

[22] Filed: Jan. 12, 1998

[51] Int. Cl.$^6$ .................. C04B 35/563; C04B 35/573; C04B 35/577

[52] U.S. Cl. .................. 501/91; 501/90; 501/93; 264/658; 264/682

[58] Field of Search .................. 501/87, 91, 93, 501/90; 264/658, 682

[56] References Cited

U.S. PATENT DOCUMENTS

| | | | |
|---|---|---|---|
| 4,320,204 | 3/1982 | Weaver | 501/91 |
| 4,518,702 | 5/1985 | Yoshida et al. | 501/91 |
| 4,524,138 | 6/1985 | Schwetz et al. | 501/91 |
| 4,684,480 | 8/1987 | Lipp et al. | 501/91 |
| 5,120,681 | 6/1992 | Cameron | 501/91 |
| 5,164,345 | 11/1992 | Rice et al. | 501/91 |
| 5,418,196 | 5/1995 | Niihara | 501/91 |

*Primary Examiner*—Karl Group
*Attorney, Agent, or Firm*—John Forrest; Roger D. Johnson

[57] ABSTRACT

Ceramic composites of silicon carbide (SiC) grains and boron carbide ($B_4C$) grains which are uniformly coated with SiC are produced by reacting stoichiometric mixtures of silicon boride ($SiB_4$, $SiB_6$) and carbon (graphite or carbon black) in situ.

18 Claims, 4 Drawing Sheets

BORON CARBRIDE/SILICON CARBIDE CERAMICS

BACKGROUND

This invention relates to ceramics and more particularly to non-oxide ceramics.

Boron carbide ($B_4C$) has a high melting temperature, exceptional hardness, and low specific gravity. However, boron carbide has a low oxidation resistance and can not be used above 600° C. in an oxidizing atmosphere. Boron carbide also has a low toughness.

Introduction of silicon carbide (SiC) improves the oxidation resistance of boron carbide ceramics. However, it would be desirable to provide $B_4C$/SiC ceramics which have greater oxidation resistance than materials presently available in the art. Such improvements might be achieved by a more effective distribution of the SiC. However, it is desirable that these improvements be accomplished at little added cost.

SUMMARY

Accordingly an object of this invention is to provide a new $B_4C$/SiC ceramic material.

Another object of this invention is to provide a new $B_4C$/SiC ceramic material having improved oxidation resistance and toughness.

A further object of this invention is to provide a new method of producing a new $B_4C$/SiC ceramic material.

These and other objects of this invention are achieved by providing a ceramic composite comprising from about 64 to about 73 volume percent of $B_4C$ and the remainder of the composite (from about 36 to about 27 volume percent) being SiC, wherein the composite is in the form of grains of $B_4C$ which are uniformly coated with SiC and grains of SiC which are uniformly distributed among the SiC-coated $B_4C$ grains.

The ceramic composite is provided by heating a stoichiometric mixture of a silicon boride powder that is $SiB_4$, $SiB_6$, or mixtures thereof with carbon in the form of carbon black, a graphite powder, or mixtures there of in an inert environment at a temperature of from about 1600° C. to about 1850° C. until the silicon boride has reacted with the carbon to form a ceramic composite comprising $B_4C$ grains which are uniformly coated with SiC and grains of SiC which are uniformly distributed among the SiC-coated $B_4C$ grains. Preferably the composite will then be hot pressed in the inert environment at a temperature of from about 1900° C. to about 2300° C. until it is fully densified.

BRIEF DESCRIPTION OF THE DRAWINGS

A more complete appreciation of the invention and many of its attendant advantages will be readily appreciated as the same becomes better understood by reference to the following detailed description when considered in connection with the accompanying drawing wherein.

Figure 1A:
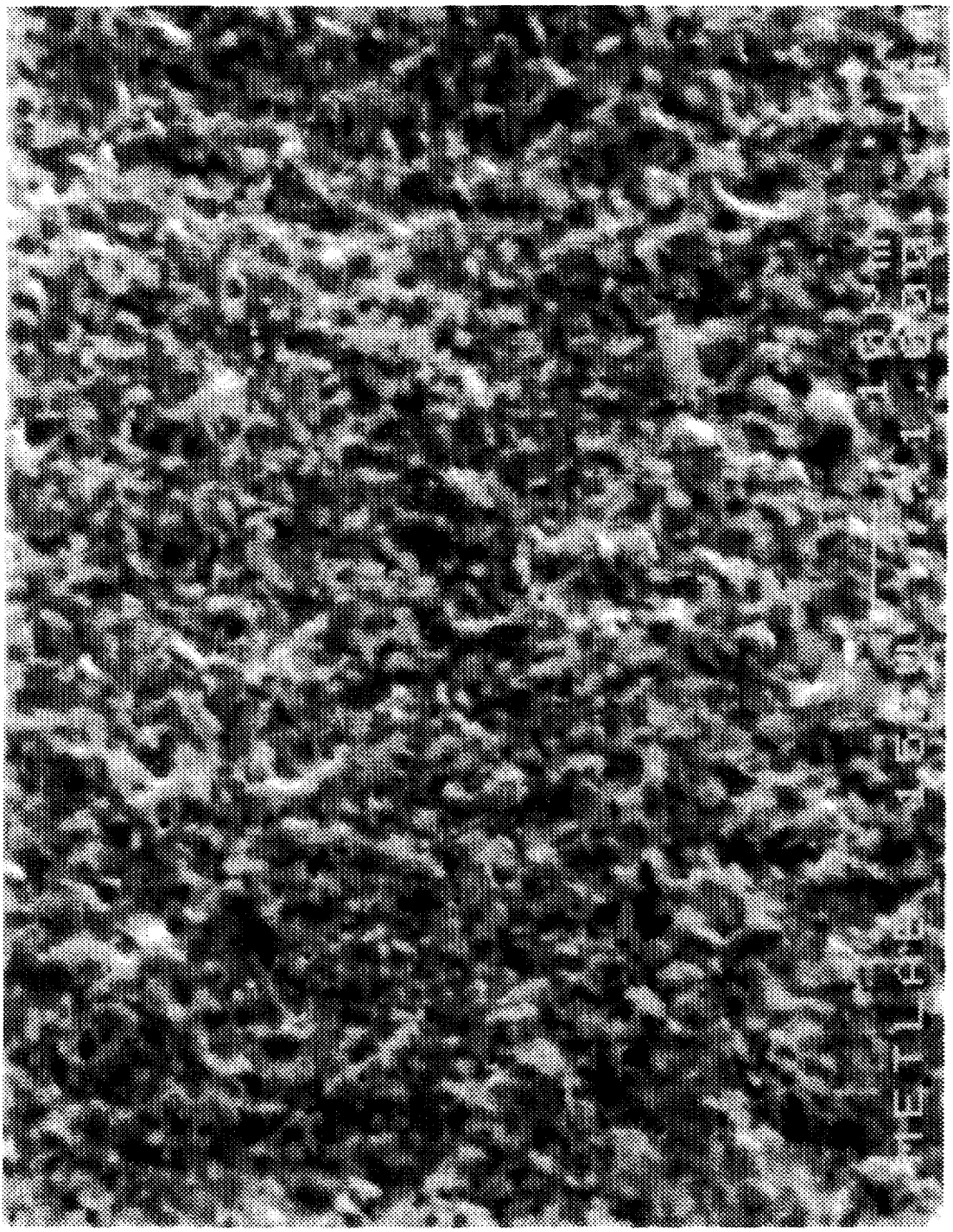
FIGS. 1A, 1B, and 1C show microstructures for fully densified $B_4C$/SiC ceramic composites produced from (A) $B_4C$ and SiC powders, (B) $SiB_4$ and graphite, and (C) $SiB_4$ and carbon black using the process of this invention.

These FIGS. are discussed in the experimental section of the detailed description.

DETAILED DESCRIPTION

The present invention provides a ceramic composite comprising boron carbide ($B_4C$) grains which are uniformly coated with SiC and grains of SiC which are uniformly distributed among the SiC-coated $B_4C$ grains. The ceramic composite is produced by reacting a silicon boride powder with carbon powder in situ. The silicon boride used is silicon tetraboride ($SiB_4$), silicon hexaboride ($SiB_6$), or mixtures thereof. The carbon powder is preferably carbon black, graphite powder, or mixtures thereof, with carbon black alone or graphite powder alone being more preferred. The silicon boride powder and carbon powder are mixed in a stoichiometric amount. The stoichiometric amount is calculated according to the following equations:

$$SiB_4 + 2C \rightarrow B_4C + SiC \qquad (1)$$

and

$$2SiB_6 + 5C \rightarrow 3B_4C + 2SiC \qquad (2)$$

The reaction between $SiB_4$ and carbon produces a $B_4C$/SiC ceramic composite composed of 64 volume percent $B_4C$ and 36 volume percent SiC, excluding porosity. The reaction between $SiB_6$ and carbon produces a $B_4C$/SiC ceramic composite composed of 73 volume percent $B_4C$ and 27 volume percent SiC, excluding porosity. These volume percentages are calculated from the weight ratios of the products ($B_4C$, SiC) of the above equations (1) and (2) and the specific densities of $B_4C$ (2.520 g/cm³) and SiC (3.217 g/cm³). $B_4C$/SiC composites over the range of from 64 to 73 volume percent $B_4C$ with the remainder being SiC can be obtained by using the appropriate mixture of $SiB_4$ and $SiB_6$ in the stoichiometric silicon boride—carbon reaction mixture. Again the volume percentages for $B_4C$ and SiC are based on the volume of solid material ($B_4C$ and SiC) and excludes any porosity.

The first step of the process is a reaction step in which the stoichiometric silicon boride—carbon mixture is heated in an inert environment at a temperature of preferably from about 1600° C. to about 1850° C., more preferably from 1750° C. to 1825° C., and most preferably about 1800° C. until the reaction between the silicon boride ($SiB_4$, $SiB_6$, or mixtures thereof) and carbon is completed. In the coarse of the chemical reaction, the formation of SiC, C, and $B_{12}(B,C,Si)_3$, $B_4C$—Si solid solution were identified. As the reaction progresses with increasing temperature or holding time, the silicon-enriched boron carbide exsolves silicon converting gradually to stoichiometric $B_4C$. The exsolved silicon, which is covering the surface of boron carbide grains, then reacts with excess carbon forming uniform SiC coatings. The final product is a ceramic composite comprising SiC-coated $B_4C$ grains and SiC grains (formed early in the reaction process) uniformly distributed among $B_4C$ grains. This reaction process is completed after heating for 1 hour at 1800° C. The reaction process will take longer at lower temperatures, but the time required at a given temperature can be easily determined. This reaction can be performed in pressureless conditions or a pressure of from more than zero to about 10 MPa can be applied during this step. The $B_4C$/SiC composite produced pressurelessly has a porosity of about 25 percent. This composite structure can be used as a ceramic preform which can be infiltrated by a suitable metal or ceramic material.

The second step of the process is a hot pressing step which is used to densify the $B_4C$/SiC ceramic composite produced in the first step above. Preferably the composite is fully densified in this step. In this step the $B_4C$/SiC ceramic composite is hot pressed in an inert environment at a temperature of preferably from about 1900° C. to about 2300° C., more preferably from 2000° C. to 2200° C., and still more preferably from 2050 to 2150° C., and most preferably about 2100° C. Hot pressing the $B_4C$/SiC ceramic composites at 2100° C. and a pressure of 20 MPa for 0.5 hour will produce a fully densified composite. A pressure of 20 MPa will also work for temperatures in the range of from more than 2100° C. to 2300° C. Greater pressure may be required for hot pressing at temperatures below 2100° C. For instance, a pressure of about 100 MPa may be required at 1900° C. The pressure required for hot pressing to achieve full densification at a given temperature can be easily determined by one of ordinary skill in the art using standard procedures. A preferred range for the pressure in this step is from about 20 MPa to about 100 MPa. Finally, a fully densified $B_4C$/SiC ceramic composite will have a porosity of less than 2 percent.

The inert environment used in the reaction (first) step and the densification (second) step may be a vacuum or a dry inert gas such as argon, helium, or neon. Care must be taken not to use a gas that will react with any of the starting materials ($SiB_4$, $SiB_6$, carbon), intermediate reaction products, or final reaction products ($B_4C$, SiC) at the high process temperatures.

The general nature of the invention having been set forth, the following examples are presented as specific illustrations thereof. It will be understood that the invention is not limited to these specific examples but is susceptible to various modifications that will be recognized by one of ordinary skill in the art.

EXPERIMENTAL

Figure 1B:
Figure 1C:
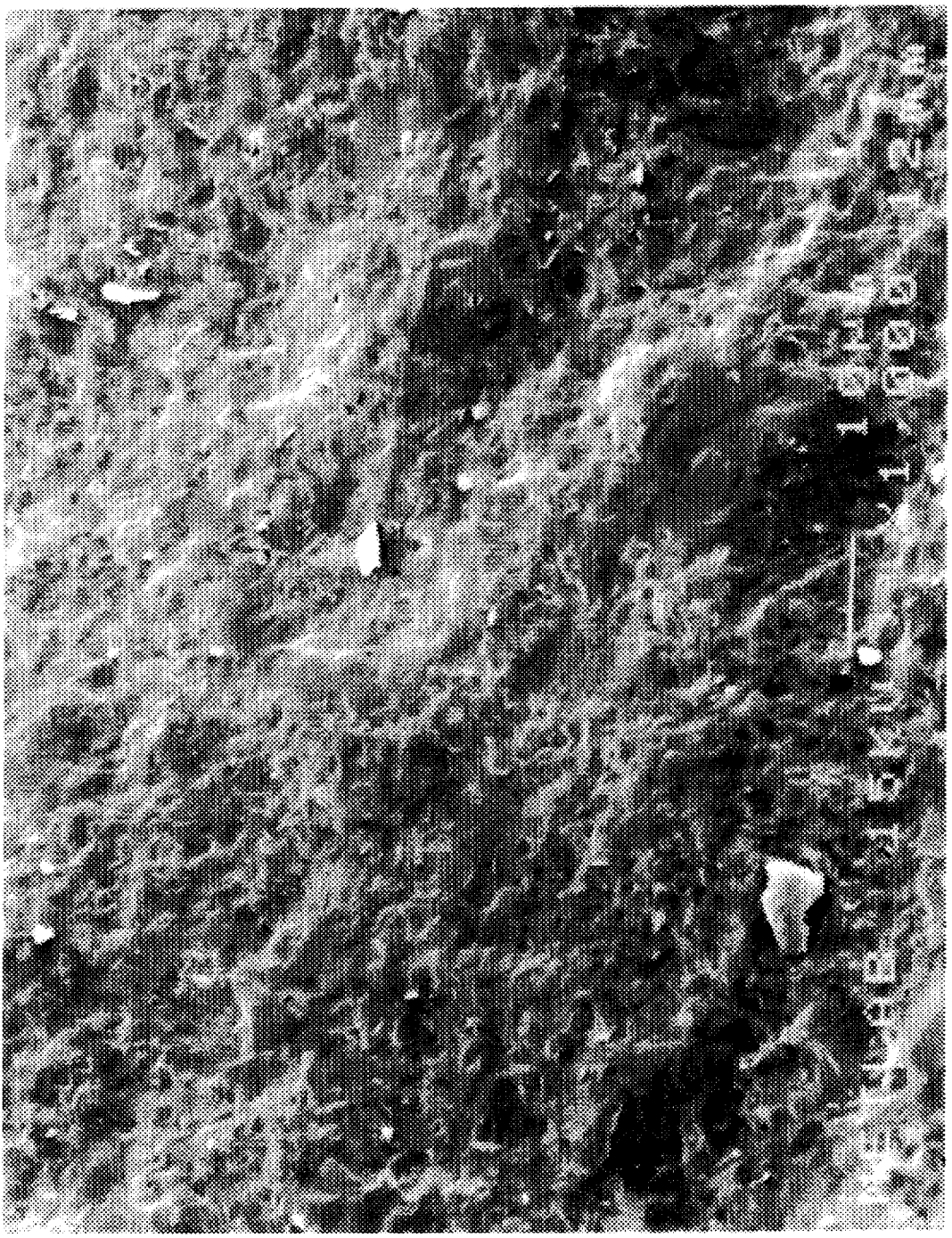

A two step hot pressing process comprising (1) a 1 hour hold at 1800° C. and 5 MPa to complete reactions and (2) a 0.5 hour hold at 2100° C. and 20 MPa to densify the material was applied to the following mixtures: (1) an equimolar mixture of $B_4C$ and SiC powders (as a control), (2) a stoichiometric mixture of $SiB_4$ powder and graphite powder, (3) a stoichiometric mixture of $SiB_4$ powder and carbon black, and (4) a stoichiometric mixture of $SiB_6$ powder and graphite powder. FIG. 1A shows the microstructure of the $B_4C$/SiC ceramic composite produced from the mixture of $B_4C$ and SiC powders (darker phase is $B_4C$ and lighter phase is SiC). The composite has a fine-grained structure with uniformly distributed, discrete $B_4C$ and SiC phases. FIG. 1B shows the microstructure of the $B_4C$/SiC ceramic composite produced from the stoichiometric mixture of $SiB_4$ powder and graphite powder. The $B_4C$/SiC ceramic composite produced has some SiC having a plate-like morphology (perpendicular to the pressing direction). FIG. 1C shows the microstructure of the $B_4C$/SiC ceramic composite produced from the stoichiometric mixture of $SiB_4$ powder and carbon black. This composite does not contain SiC exhibiting a plate-like morphology. However, the tortuous fracture surface of this composite material may indicate a very high fracture toughness. Finally, the ceramic composite produced from the stoichiometric mixture of $SiB_6$ and graphite has a microstructure (not shown) similar to that produced from the stoichiometric mixture of $SiB_4$ and graphite.

Figure 2:
FIG. 2 is a high magnification scanning electron microscope picture of a $B_4C$/SiC ceramic composite produced from $SiB_4$ and graphite using the process of this invention.

High magnification scanning electron microscope analysis of $B_4C$/SiC ceramic composites formed by reacting silicon boride ($SiB_4$ or $SiB_6$) powders with carbon (graphite or carbon black) indicated that SiC forms a continuous grain boundary phase on $B_4C$. The phenomenon is most easily detected in the $B_4C$/SiC ceramics prepared by reacting the silicon borides with graphite and is clearly shown in FIG. 2 for ceramics prepared from $SiB_4$ and graphite.

The preferred embodiment for a process is using a stoichiometric mixture of a silicon boride ($SiB_4$ or $SiB_6$) and carbon and holding it in an inert environment at 1800° C. and 5 MPa for 1 hour and then holding it in the inert environment at 2100° C. and 20 MPa for 0.5 hour. Using $SiB_4$ is preferred where a higher SiC concentration is desired in the product for better oxidation resistance. The preferred embodiment composite comprises 64 volume percent $B_4C$ and 36 volume percent SiC. The preferred embodiment composite is fully densified and has a porosity of less than 2 percent.

Obviously, other modifications and variations of the present invention may be possible in light of the foregoing teachings. It is therefore to be understood that within the scope of the appended claims the invention may be practiced otherwise than as specifically described.

What is claimed is:

1. A process for making a ceramic composite comprising:
heating a stoichiometric mixture of a silicon boride powder that is $SiB_4$, $SiB_6$, or mixtures thereof and a carbon powder that is carbon black, graphite powder, or mixtures thereof in an inert environment at a temperature of from about 1600° C. to about 1850° C. until a ceramic composite comprising grains of $B_4C$ which are uniformly coated with SiC and grains of SiC which are uniformly distributed among the SiC-coated $B_4C$ grains is formed.

2. The process of claim 1 wherein the heating is pressureless.

3. The process of claim 1 wherein a pressure of from more than zero to about 10 MPa is applied during the heating.

4. The process of claim 1 wherein the temperature is from 1750 to 1825° C.

5. The process of claim 1 wherein after the heating is completed, the formed ceramic composite is hot pressed in an inert environment until the composite is fully densified.

6. The process of claim 5 wherein the hot pressing is done at a temperature of from about 1900° C. to 2300° C.

7. The process of claim 6 wherein the hot pressing is done at a temperature of from 2000° C. to 2200° C.

8. The process of claim 7 wherein the hot pressing done at a temperature of from 2050° C. to 2150° C.

9. The process of claim 5 wherein the hot pressing is done at a pressure of from about 20 to about 100 MPa.

10. The process of claim 9 wherein the hot pressing is done at a pressure of from 20 to 30 MPa.

11. The process of claim 1 wherein the silicon boride powder is $SiB_4$.

12. The process of claim 1 wherein the silicon boride powder is $SiB_6$.

13. The process of claim 1 wherein the carbon powder is carbon black.

14. The process of claim 1 wherein the carbon powder is graphite powder.

15. The process of claim 5 wherein the silicon boride powder is $SiB_4$.

16. The process of claim 5 wherein the silicon boride powder is $SiB_6$.

17. The process of claim 5 wherein the carbon powder is carbon black.

18. The process of claim 5 wherein the carbon powder is graphite powder.

* * * * *